Feb. 27, 1951 — F. A. OLMSTED — 2,543,297
COOKING APPLIANCE
Filed April 13, 1948 — 3 Sheets-Sheet 1
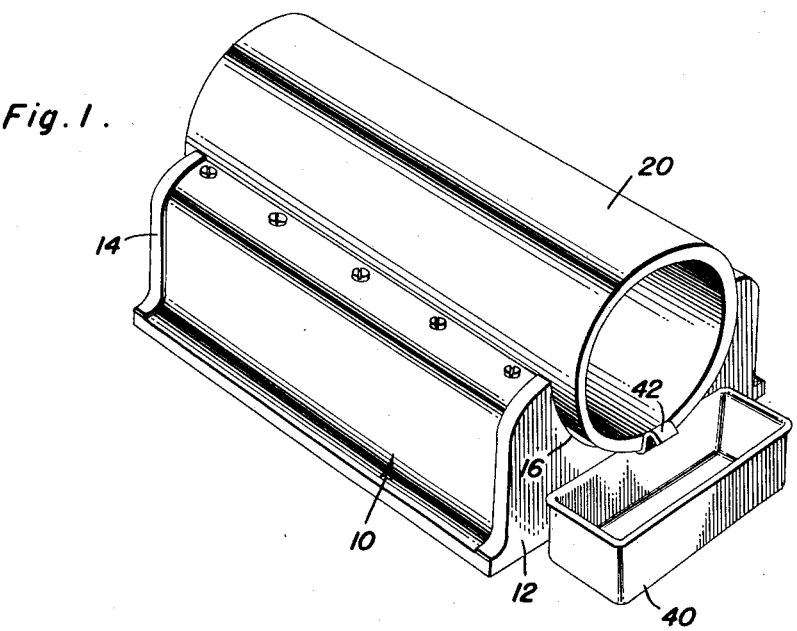
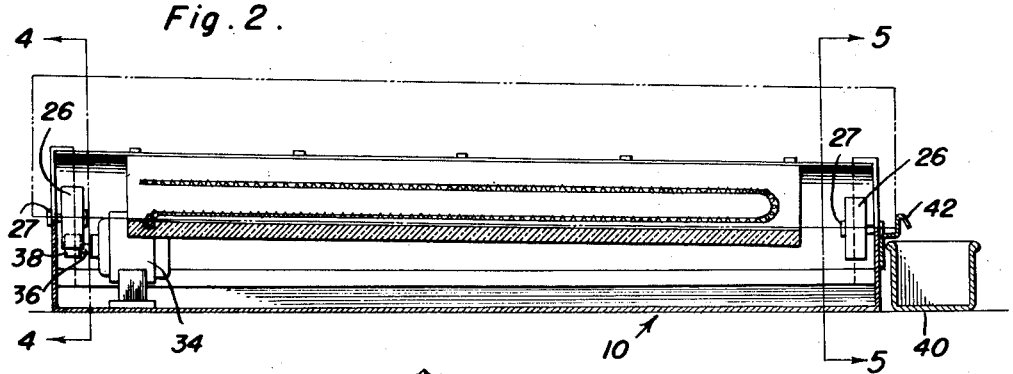
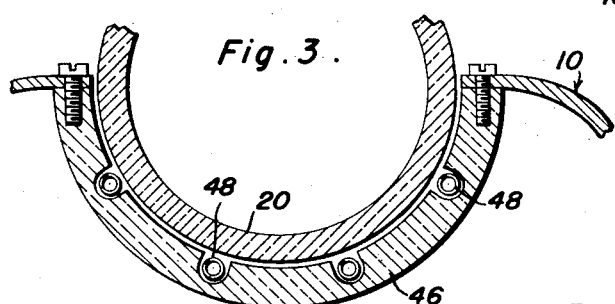
Inventor
Francis A. Olmsted Feb. 27, 1951 F. A. OLMSTED 2,543,297
COOKING APPLIANCE
Filed April 13, 1948 3 Sheets-Sheet 2

*Inventor*
Francis A. Olmsted

By *Clarence A. O'Brien*
and *Harvey B. Jacobson*
Attorneys

Feb. 27, 1951     F. A. OLMSTED     2,543,297
COOKING APPLIANCE

Filed April 13, 1948     3 Sheets-Sheet 3

Francis A. Olmsted
INVENTOR.

Patented Feb. 27, 1951

2,543,297

UNITED STATES PATENT OFFICE 2,543,297

COOKING APPLIANCE

Francis A. Olmsted, Hopkinton, Mass.

Application April 13, 1948, Serial No. 20,701

10 Claims. (Cl. 219—19)

This invention relates to novel and useful improvements in cooking appliances.

An object of this invention is to cook a frankfurter or other article of food so that the article of food may be cooked slowly in its inherent fat, oil and other substances.

Another object of this invention is to maintain a rotor in a rotating condition, the rotor being juxtaposed relative to heating coils, whereby the majority of the cooking takes place by conduction and radiation.

Another object of this invention is to maintain a rotor in an inclined position, with the articles to be cooked therein, whereby the excess oil, fat and other substances may be drained from the rotor.

Another object of this invention is to provide improved means for actuating the said rotor.

Another object of this invention is to provide an improved device of the character described whereby cooking operations in certain types of establishments may be performed in a more sanitary condition.

Ancillary objects and features of novelty will become apparent to those skilled in the art, in following the description of the preferred form of the invention, illustrated in the accompanying drawings, wherein:

Figure 1 is a perspective view of one form of the invention;

Figure 2 is a longitudinal sectional view of the invention shown in Figure 1;

Figure 3 is an enlarged fragmentary detail of construction;

Figure 4:
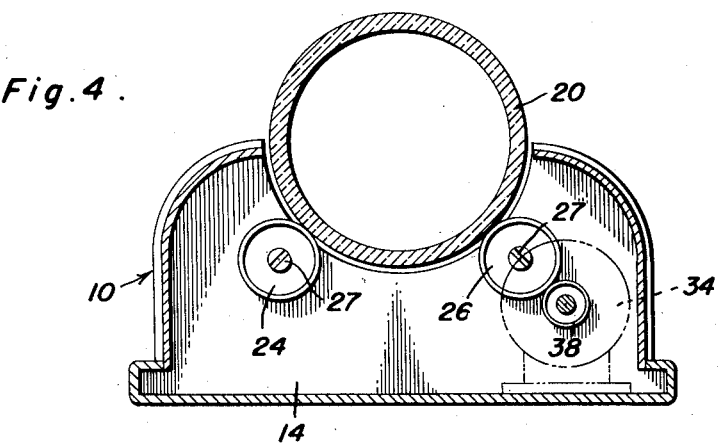
Figure 4 is a sectional view taken on the line 4—4 in Figure 2.
Figure 5:
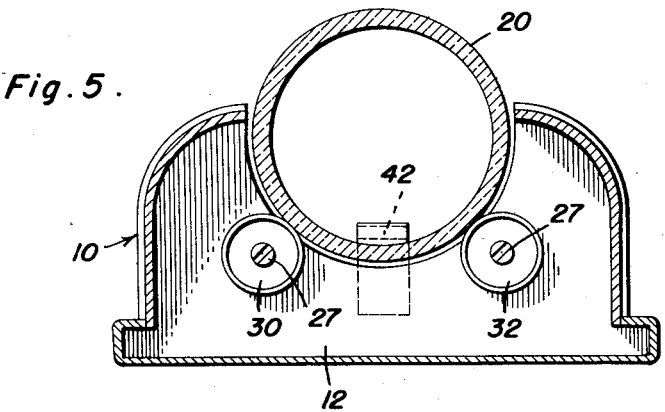
Figure 5 is a sectional view taken on the line 5—5 of Figure 2 and in the direction of the arrows.
Figure 6:
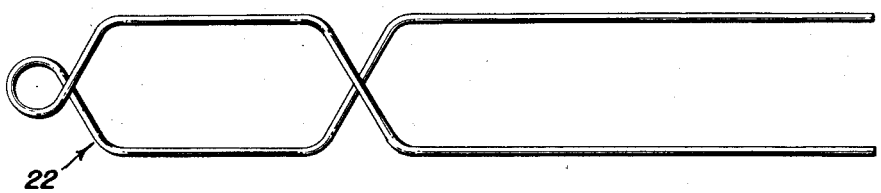
Figure 6 is an elevational view of a lifter for removing the rotor from its associated housing.

This invention has been developed to provide a device for prevention of dust, dirt and other impurities in cooking certain foods such as frankfurters and the like.

The general operation of the present invention is as follows: A housing is supplied with a rotor therein, the rotor being of transparent material and electrically as well as heat insulating. By use of this type of rotor, radiant heat as well as conducted heat may be received from the heating coils of the housing. Articles of food are placed in the rotatable tubular rotor and by manipulation of a conventional switch, the rotor is set in motion. This cooks the articles of food; for instance frankfurters, so that they will be free from absorption of ordinary accumulated fat or grease such as found in pans, grills or the like. Further, it is one of the prime purposes of the present invention to cook the frankfurter evenly, that is, by rotation of the rotor the frankfurter is also rotated thereby cooking it more evenly.

The structure for performing this type of cooking operation is shown in two forms of the invention, one of which includes a housing generally indicated at 10 and provided with end plates 12 and 14 respectively. The said end plates have recesses 16 therein for accommodation of the rotor 20. The said rotor is preferably tubular in shape and of a heavy glass construction. Also, the rotor is simply rested in the recess or open top portion of the housing 10 for subsequent rotation. It is easily detached by means of the resilient tongues 22 or some other suitable equivalent means.

Pairs of rollers are journaled in the end plates 12 and 14 respectively of the said housing 10, the rollers 24 and 26 being at the rear end of the device. These rollers may have a resilient cover thereon conducive of friction between the rotor 20 and the said rollers. Of course, suitable stub shafts 27 or the like may be utilized for journaling the said rollers. The rollers 24 and 26 are so positioned as to raise the rear portion of the rotor 20 relative to the front or lower portion. This is accomplished by utility of a second pair of rollers 30 and 32 respectively which are secured to the front end plate 12 of the said housing 10. The positioning of the front set of rollers is lower than the rear set thereby maintaining the rotor 20 in a position of angularity relative to the housing 10.

A conventional motor 34 is seated in the housing 10 and has a drive shaft 36 extending therefrom. This drive shaft has a relatively small roller 38 secured thereto which is in operative engagement with the said roller 26. By this means the motor drives the small roller 38 which in turn actuates the said roller 26. Thereupon, the rotor 20 is actuated, thereby turning the idler 24.

A drip pan 40 may be positioned adjacent the forward end of the said rotor 20 for the obvious purpose of accumulating waste fats and grease. Also, since the rotor is journaled at an angle of inclination, a clip 42 may be secured to the end plate 12 for cooperation with the end of the rotor 20. The said end of the rotor may bear against the clip 42 thereby preventing excessive movement of the rotor within its opening formed by the recesses 16. If it is found desirable, the rollers may be set at an angle of inclination in order to partially or entirely offset the creep due to the angularity of the rotor.

A plurality of spaced apertures are supplied in the housing and an insulating container having a shape complemental to the external configuration of the rotor 20 is attached within the housing by means of screws or the like extending through these apertures. The container 46 accommodates conventional heating elements 48 which partially flank the rotor 20, for transfer of heat by means of conduction and radiation. The heating elements 48 are recessed in grooves formed in the container 46.

Figure 7:
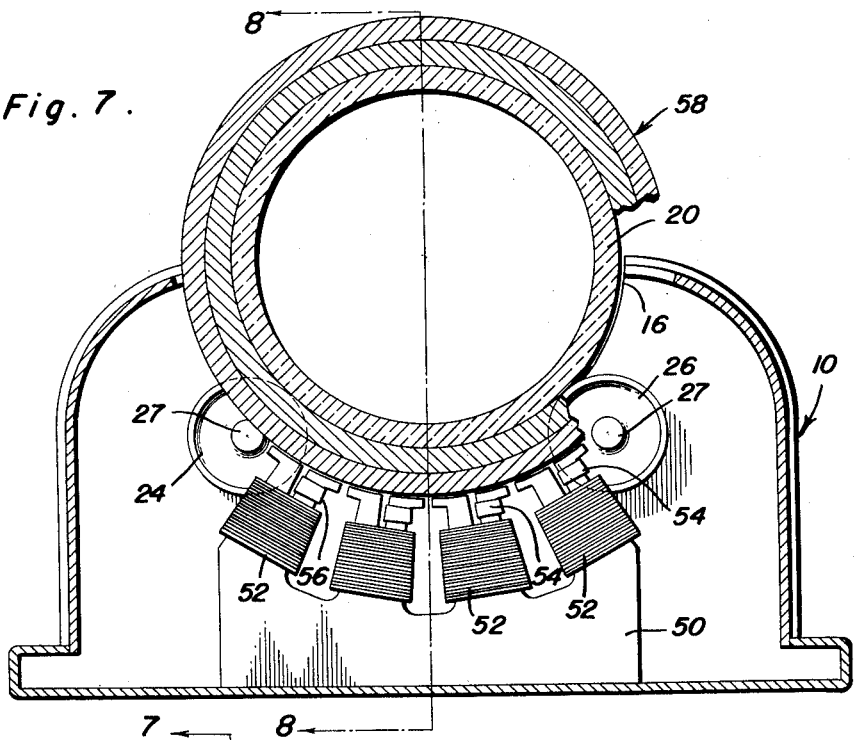
Figure 7 is a sectional view of a second form of the invention.
Figure 8:
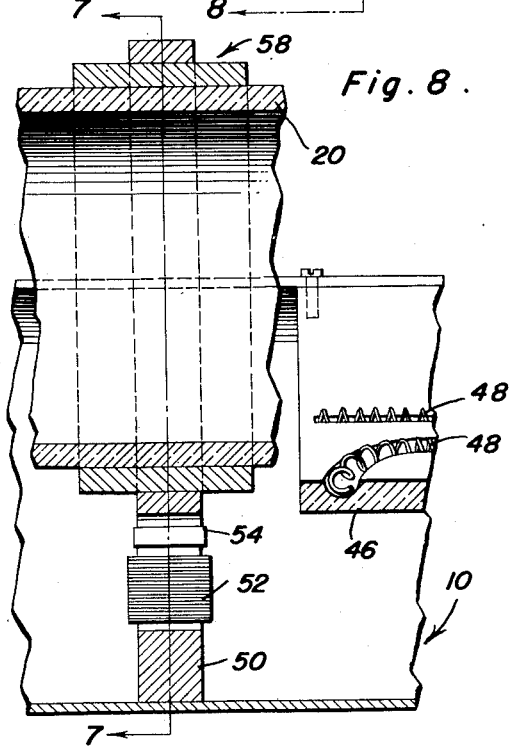
Figure 8 is an enlarged fragmentary detail view illustrating certain details of construction of the second form of the invention.

Referring now primarily to Figures 7 and 8 a second form of the invention is illustrated. This second form differentiates from the first in that the rotor 20 is properly a portion of a rotor of a motor. The motor 34 is obviated in this form of the invention in favor of a conventional laminated stator 50 which is attached to the bottom of the said housing 10. This bracket accommodates a plurality of field coils 52 which may be any practical number. The field coils 52 are so positioned as to be radially disposed relative to the rotor 20 and a plurality of shading coils 54 may be supplied in association with the field coils. By utility of the shading coils, the rotor is given its initial thrust due to the high value of flux density set up by the stator (laminated stator 50 and field 52) excitation in only half of the portion of the stator 50 which supports the field coil 52.

A metallic ring generally indicated at 58 circumscribes the said rotor insulating element 20 for cooperation with the flux set up by the coils 52 and 54. By this means the rotor is actuated in order to perform the cooking operation.

The remainder of this form of the invention is identical to that of the first described form, the differentiating feature obviously being the substitution of the various motor elements for cooperation with the tubular element 20 or the conventional motor 34.

While it has been described and illustrated but the preferred forms of the invention, it is apparent that variations may be made without departing from the spirit thereof. Therefore, limitation is sought only in accordance with the scope of the following claims.

Having described the invention, what is claimed as new is:

1. A cooking appliance comprising a housing having sides, end walls with recesses at the upper edges, a bottom and a top having a longitudinal slot therein, a substantially semi-cylindrical container of electrically insulating material fixed to said top beneath said slot, recesses in said container with heating elements disposed therein, rollers mounted for rotation at each end wall of said housing, the rollers at one end being lower than the rollers at the other end, a hollow food supporting rotor disposed on said rollers and positioned in said slot above said container, one end of said rotor extending through the recess in one end wall to facilitate drainage, and electrically operative means for actuating said rotor.

2. A cooking appliance comprising a housing having sides, end walls with recesses at the upper edges, a bottom and a top having a longitudinal slot therein, a substantially semi-cylindrical container of electrically insulating material fixed to said top beneath said slot, recesses in said container with heating elements disposed therein, rollers mounted for rotation at each end wall of said housing, the rollers at one end being lower than the rollers at the other end, a hollow food supporting rotor disposed on said rollers and positioned in said slot above said container, one end of said rotor extending through the recess in one end wall to facilitate drainage, electrically operative means for actuating said rotor, and a clip fixed to said last mentioned end wall engaged by said rotor to limit the axial travel of said rotor.

3. A cooking appliance comprising a housing having sides, end walls with recesses at the upper edges, a bottom and a top having a longitudinal slot therein, a substantially semi-cylindrical container of electrically insulating material fixed to said top beneath said slot, recesses in said container with heating elements disposed therein, rollers mounted for rotation at each end wall of said housing, the rollers at one end being lower than the rollers at the other end, a hollow food supporting rotor disposed on said rollers and positioned in said slot above said container, one end of said rotor extending through the recess in one end wall to facilitate drainage, and electrically operative means for actuating said rotor including a motor disposed in said housing with means drivingly connecting said motor and one of said rollers.

4. In a cooking appliance, a glass infrared transmissive cylinder for holding the food, a base-forming housing having in its top surface an upwardly facing semi-cylindrical trough having a diameter slightly greater than that of the cylinder, sets of rollers for upwardly removably supporting the cylinder therein, motor means disposed at least partially in the housing for rotating the cylinder in the trough, and infrared radiant heating means lining the trough.

5. In a cooking appliance, a glass infrared transmissive cylinder for holding the food, a base-forming housing having in its top surface an upwardly facing semi-cylindrical trough having a diameter slightly greater than that of the cylinder, sets of rollers for upwardly removably supporting the cylinder therein, motor means disposed at least partially in the housing for rotating the cylinder in the trough, and infrared radiant heating means lining the trough, said housing having a longitudinal axis, one of said sets of rollers being disposed at one end of said housing and another set of said rollers being disposed at the opposite end of said housing, and the last mentioned sets of rollers being vertically spaced different amounts from said axis to thereby support said cylinder at an angle with respect to said axis to gravitationally drain said cylinder.

6. A cooker comprising a base forming housing, an upwardly opening semi-cylindrical trough in the top of said housing, a food supporting rotor removably disposed in said trough and recessed in said housing, said rotor being upwardly removable from said trough, said rotor being mounted for rotation by sets of rollers in said housing and having a bore, an infrared radiant heating element mounted in and lining said trough, said rotor being of glass infrared transmissive material, means carried by said housing for actuating said rotor including field coils disposed in said housing, and said rotor constituting a part of an armature which is cooperative with said field coils to form an electrically operative motor.

7. In a cooking appliance, a base forming housing having a longitudinal axis and a top surface provided with an upwardly opening semi-cylindrical trough, a cylindrical rotor adapted to support food and detachably positioned in the trough, said trough having a diameter slightly greater than the rotor, means for actuating said rotor, means including sets of rollers for upwardly removably supporting said rotor at an angle relative to the axis of the housing, infra-red radiant heating means lining said trough, said rotor being of glass infra-red tansmissive material and having a conductive sleeve therearound, and said actuating means including field coils in said housing disposed adjacent to but spaced from said rotor and sleeve.

8. A cooking appliance comprising a housing constituting a base and having sides, end walls with recesses at the upper edges, a bottom and a top having a longitudinal slot therein, an upwardly opening substantially semi-cylindrical trough of electrically insulating material fixed to said top beneath said slot, said trough having recesses in the upper surface thereof with infra-red radiant heating elements disposed therein and lining said trough, sets of rollers mounted for rotation at each end wall of said housing, the rollers at one end being lower than the rollers at the other end, a food supporting hollow and cylindrical rotor disposed on said rollers and positioned in said slot above and in said trough, said rotor being of glass infra-red transmissive material and being upwardly removable from said trough, one end of said rotor extending through the recess in one end wall to facilitate drainage from said rotor, electrically operative means for actuating said rotor, a clip fixed to said last-mentioned end wall contacted by said rotor to limit the axial travel of said rotor, said rotor actuating means including an armature fixed to said rotor, and field coils disposed in said housing adjacent to said armature.

9. A device for cooking, said device comprising a base forming housing having a top and ends, a recess in one of said ends and a longitudinal slot in each of said ends, said top having a longitudinal slot with an upwardly opening trough provided therein, a food receiving cylindrical rotor of glass infra-red transmissive material disposed in said trough and partially recessed in said housing and protruding through said recess in one of said ends, an infra-red radiant heater lining said trough, sets of rollers supporting said rotor in said trough, and means carried by said housing for actuating said rotor including field coils disposed in said housing, and said rotor constituting a part of an armature.

10. The combination of claim 9, and a clip carried by said housing adjacent to said recess and contacted by said rotor to prevent axial creep of said rotor.

FRANCIS A. OLMSTED.

REFERENCES CITED

The following references are of record in the file of this patent:

UNITED STATES PATENTS

| Number | Name | Date |
|---|---|---|
| 1,176,814 | Bullis | Mar. 28, 1916 |
| 1,433,735 | MacFarland | Oct. 31, 1922 |
| 1,767,802 | Langos | June 24, 1930 |
| 1,880,822 | Cook et al. | Oct. 4, 1932 |
| 1,937,416 | Smith | Nov. 28, 1933 |
| 2,041,318 | Berger | May 19, 1936 |
| 2,104,465 | Lewis | Jan. 4, 1938 |
| 2,340,345 | Richeson | Feb. 1, 1944 |

FOREIGN PATENTS

| Number | Country | Date |
|---|---|---|
| 414,921 | Germany | June 13, 1925 |